(12) United States Patent
Shen et al.

(10) Patent No.: US 12,436,344 B1
(45) Date of Patent: Oct. 7, 2025

(54) OPTICAL FIBER ARRAY CONNECTOR DEVICE

(71) Applicant: Twinstar Technologies Co. Ltd., Shanghai (CN)

(72) Inventors: Jinxi Shen, San Ramon, CA (US); Wei Hou, Shanghai (CN); Kuishan Liu, Xiangyang (CN); Lianjun Zhang, Shanghai (CN)

(73) Assignee: Twinstar Technologies Co. Ltd., Shanghai (CN)

( * ) Notice: Subject to any disclaimer, the term of this patent is extended or adjusted under 35 U.S.C. 154(b) by 0 days.

(21) Appl. No.: 19/087,342

(22) Filed: Mar. 21, 2025

(30) Foreign Application Priority Data

Feb. 5, 2025 (CN) .......................... 202510131153.8

(51) Int. Cl.
*G02B 6/42* (2006.01)
(52) U.S. Cl.
CPC .................................. *G02B 6/4243* (2013.01)
(58) Field of Classification Search
CPC .................................................... G02B 6/4243
See application file for complete search history.

(56) References Cited

U.S. PATENT DOCUMENTS

| | | | |
|---|---|---|---|
| 6,810,165 B2 | 10/2004 | Golub et al. | |
| 10,018,787 B1 | 7/2018 | Wang et al. | |
| 10,684,419 B2 | 6/2020 | Fortusini et al. | |
| 10,725,245 B2 | 7/2020 | Leigh et al. | |
| 11,086,085 B2 | 8/2021 | Morishima | |
| 2002/0146213 A1* | 10/2002 | Shigenaga | G02B 6/3839 385/78 |
| 2006/0188211 A1 | 8/2006 | Iwase et al. | |
| 2011/0280039 A1* | 11/2011 | Kishimoto | G02B 6/4298 362/519 |
| 2022/0291461 A1 | 9/2022 | Elsinger et al. | |

FOREIGN PATENT DOCUMENTS

WO      2021183792      9/2021

* cited by examiner

*Primary Examiner* — Uyen Chau N Le
*Assistant Examiner* — Hoang Q Tran
(74) *Attorney, Agent, or Firm* — Mestechkin Law Group P.C.

(57) ABSTRACT

An optical fiber array unit of an optical connector includes an opposing pair of grooved plates holding at least three rows of optical fibers between them, with at least some of the optical fibers in each of the at least three rows touching two optical fibers of an adjacent one of the at least three rows. Each grooved plate of the opposing pair has an array of parallel fiber-holding grooves. In some implementations, a groove pitch of the array may be such that the cores of the optical fibers are located at nodes of a square lattice.

17 Claims, 10 Drawing Sheets

OPTICAL FIBER ARRAY CONNECTOR DEVICE

REFERENCE TO RELATED APPLICATION

This application claims the benefit of Chinese Patent Application No. 2025101311538 filed Feb. 5, 2025, the entire contents of which is incorporated herein by reference.

TECHNICAL FIELD

The present disclosure generally relates to optical communication systems and components thereof, and more particularly relates to optical connectors.

BACKGROUND

Optical interconnects capable of high-density data traffic may be useful in data communication and processing systems, such as large data centers and computer systems supporting artificial intelligence (AI) computations. To reduce power consumption and simplify manufacturing and installation of data service equipment, such interconnects should preferably be passive, pluggable, and capable of interconnecting two high-density optical fiber arrays, or connecting a high-density optical fiber array to a photonic chip.

SUMMARY

An aspect of the present disclosure provides an apparatus comprising an optical fiber array unit. The optical fiber array unit comprises an opposing pair of grooved plates, each grooved plate of the opposing pair has an array of parallel fiber-holding grooves having a groove pitch P. At least three rows of optical fibers having longitudinally aligned ends thereof are being held between the opposing pair of grooved plates, such that optical cores of said ends of the optical fibers are located at nodes of a square lattice, with at least some of the optical fibers in each of the at least three rows touching two optical fibers of an adjacent one of the at least three rows.

In at least some implementations, optical fibers of one of the at least three rows are displaced with a lateral offset of approximately one half of the groove pitch P relative to the optical fibers in an adjacent one the at least the three rows.

In some implementations, the groove pitch P of the array of parallel fiber-holding grooves of each grooved plate is approximately $\sqrt{2}d$, where d is an outer diameter of at least some of the optical fibers held between the opposing pair of grooved plates. In some of such implementations, the outer fiber diameter d is approximately 125 µm. In some of such implementations, the groove pitch P may be approximately 177 µm. In some of these implementations, the groove pitch P may be in a range from 166 µm to 188 µm.

In some other implementations, the outer fiber diameter d is approximately 80 µm. In some of these implementations, the groove pitch P may be approximately 113 µm. In some of these implementations, the groove pitch P may be in a range from 103 µm to 123 µm.

In any of the above implementations, the fiber-holding grooves may comprise v-grooves. In some implementations, the v-grooves may have an apex angle of less than 90°. In some implementations, the apex angle of each of the v-grooves may be approximately 60°.

In some of the above implementations, at least some of the optical fibers of one of the at least three rows may have an outer fiber diameter of $d_1$; at least some of the optical fibers in an adjacent one of the three rows may have an outer fiber diameter of $d_2$; and the groove pitch P of each v-grooved plate of the opposing pair may be approximately $(d_1+d_2)/\sqrt{2}$.

In some of the above implementations, the longitudinally aligned ends of the optical fibers may be held between the opposing pair of grooved plates in three rows, wherein the optical fibers in two outer ones of the three rows are located partly in the fiber-holding groves. In some of these implementations, the longitudinally aligned ends of the optical fibers of the optical fiber array may each have a same nominal outer fiber diameter d, and the groove pitch P may be approximately $\sqrt{2}d$.

In any of the above implementations, the apparatus may comprise an optical connector including the fiber array unit. In some implementations, the optical connector may further comprise a 2D micro-lens array disposed at an end face of the fiber array unit, the 2D micro-lens array comprising at least three rows of microlenses, each of the microlenses optically coupled to a corresponding one of the optical fibers of the optical fiber array unit. The microlenses in each row of the 2D micro-lens array may be disposed in a square lattice matching the square lattice of the optical fiber array unit.

An aspect of the present disclosure provides an apparatus comprising an optical fiber array unit. The optical fiber array unit comprises an opposing pair of grooved plates, each grooved plate of the opposing pair has an array of parallel fiber-holding grooves having a groove pitch P. At least three rows of optical fibers having longitudinally aligned ends thereof are being held between the opposing pair of grooved plates, such that optical cores of said ends of the optical fibers are located at nodes of a square lattice, with at least some of the optical fibers in each of the at least three rows touching two optical fibers of an adjacent one of the at least three rows; and wherein the groove pitch P of the array of parallel fiber-holding grooves of each grooved plate is approximately $\sqrt{2}d$, where d is a nominal outer diameter of at least some of the optical fibers held between the opposing pair of grooved plates.

An aspect of the present disclosure provides an apparatus comprising an optical fiber array unit. The optical fiber array unit comprises an opposing pair of grooved plates, each grooved plate of the opposing pair has an array of parallel fiber-holding grooves having a groove pitch P. At least three rows of optical fibers having longitudinally aligned ends thereof are being held between the opposing pair of grooved plates, such that optical cores of said ends of the optical fibers are located at nodes of a square lattice, with at least some of the optical fibers in each of the at least three rows touching two optical fibers of an adjacent one of the at least three rows; and wherein at least some of the optical fibers of one of the at least three rows may have an outer fiber diameter of $d_1$; at least some of the optical fibers in an adjacent one of the three rows may have an outer fiber diameter of $d_2$; and the groove pitch P of each v-grooved plate of the opposing pair may be approximately $(d_1+d_2)/\sqrt{2}$.

BRIEF DESCRIPTION OF THE DRAWINGS

Example embodiments disclosed herein will be described in greater detail with reference to the accompanying drawings, which are not to scale, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present disclosure. However, it will be apparent to one skilled in the art that the present disclosure may be practiced in other embodiments that depart from these specific details. In other instances, detailed descriptions of well-known methods, devices, and circuits may be omitted so as not to obscure the description of the present disclosure. All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

Note that as used herein, the terms "first", "second" and so forth are not intended to imply sequential ordering, but rather are intended to distinguish one element from another, unless explicitly stated. Similarly, sequential ordering of method steps does not imply a requirement of sequential order of their execution, unless explicitly stated. The phrase "such as", when preceded by a comma (" . . . , such as . . . "), means that the nouns introduced by "such as" must be understood as examples, not as definitions. In other words, the phrase "such as", when preceded by a comma, is synonymous with "e.g." or "for example". The term "connected" may encompass direct connections or indirect connections through intermediate elements, unless explicitly stated otherwise. The term "main plane" of an object, such as, e.g., a substrate, an optical fiber array connector, or a chip, is a plane parallel to a substantially planar surface thereof that has about the largest area among exterior surfaces of the object; this substantially planar surface may be referred to as a main surface. Here "substantially planar" or "planar" may encompass slightly bent substrates or surfaces, when the radius of the bending-related vertical displacement across a width of a relevant waveguide is smaller than a characteristic size of the waveguide in the direction of the displacement. Exterior surfaces of the object, e.g., a chip, that have one relatively large size, e.g., length or width, but are of much smaller area, e.g., less than one third of the area of the main surface, are typically referred to as the edges of the object. The term "vertical" refers to a direction generally perpendicular to a main plane of an object, e.g., a main surface of a substrate or a support member, along which relevant elements, such as optical fibers in an optical fiber array connector or various element of a photonic integrated circuit (PIC), are disposed. The term "horizontal" refers to a direction along said plane, e.g. along a main surface of a substrate or a fiber array support member and are not related to an orientation of the corresponding element in space.

Example embodiments described herein relate to a fiber array unit (FAU) wherein a 2D optical fiber array (OFA) is held between two grooved surfaces. The example FAUs described below may be used, e.g., in an optical connector for connecting a 2D OFA to another optical element or device, such as but not exclusively another optical fiber array or a photonic chip. 2D optical fiber arrays are multi-fiber arrangements in which parallel optical fiber, or adjacent segments thereof, are positioned in multiple, e.g., three or more, rows, with three or more fibers in each row. A row of optical fibers is a sequence of three of more parallel optical fibers, or parallel segments thereof, aligned in the same plane one after another. A 2D OFA may also be referred to as a multi-row OFA. The term "2D" (two-dimensional) refers to a cross-section of the OFA by a plane normal to the optical axes of the fibers.

FIGS. 1-4, 6A, 6B, 7A, 7B, 9A-11 illustrate various example FAUs, elements thereof, and related systems and devices with reference to an example Cartesian coordinate system (X,Y,Z) 11 ("coordinate system 11") having the Z-axis directed along the optical fibers in the FAU ("longitudinal direction"). The X-axis of the coordinate system 11 is directed along a row of the OFA of the FAU, or along grooved surfaces holding the OFA of the FAU in place, normally to the longitudinal direction of the grooves; this direction may be referred to as the lateral direction or the horizontal direction. The direction along the Y-axis of the coordinate system 11, i.e. perpendicular to the fiber rows of the OFA and to the grooved surfaces, from one fiber row to another, may be referred to as the transverse direction or the vertical direction.

Figure 1:
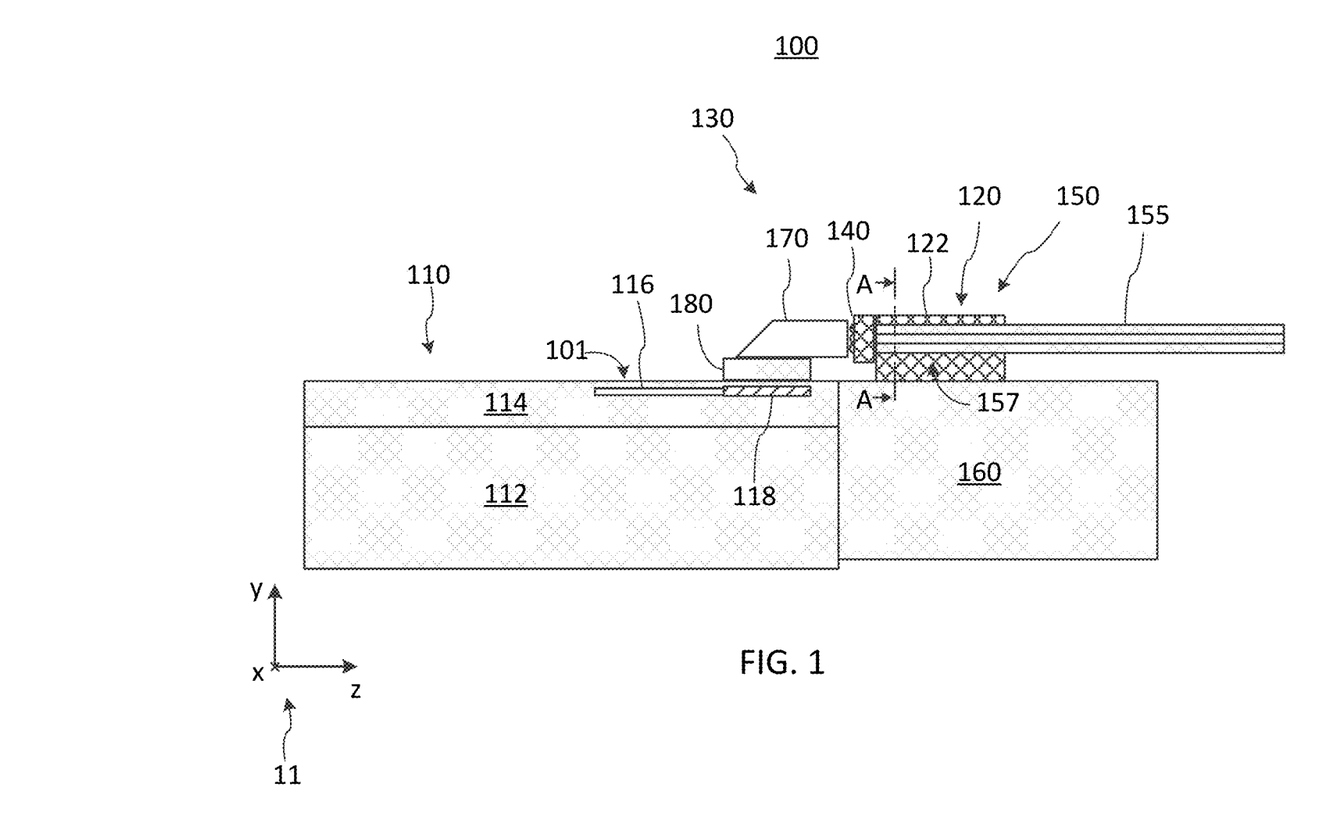
FIG. 1 is a schematic cross-sectional side view of a photonic chip coupled to a 2-dimensional (2D) optical fiber array using an optical fiber array unit (FAU)

FIG. 1 shows a schematic cross-sectional view of an example optical system 100 where some embodiments of the present disclosure may be used. The optical system 100 includes a photonic chip 110, an optical fiber array (OFA) 155, and an optical coupling arrangement 130 for coupling the optical fiber array 155 to the photonic chip 110 via a top surface thereof 101. The photonic chip 110, which may be, e.g., a SiP chip, includes a substrate 112 and a photonic integrated circuit (PIC) 114 disposed thereon. The optical coupling arrangement 130 includes an optical fiber array connector (OFAC) 150, which in turn includes a FAU 120 that may be supported by a base unit 160. In some implementations the OFAC 150 further includes a first lens array 140 adjacent to fiber-end faces of the optical fiber array 155 for focusing and/or collimating light coupled into or out of the optical fibers of the OFA 155. The optical coupling arrangement 130 further includes a turning prism 170 and, possibly, a second lens array 180. The second lens array 180 may be located between a chip facing surface of the turning prism 170 and the top surface 101 of the chip 110. The chip 110 may include a 2D array grating 118 formed at the top surface 101 for providing vertical optical coupling between optical waveguides 116 of the PIC 114 and the prism 170. The FAU 120 includes an array holder 122 configured to hold longitudinally aligned end segments 157 ("ends 157") of optical fibers of the optical fiber array 155 in a fixed arrangement relative to each other and to the array holder 122. Optical fibers of the optical fiber array 155 may be disposed in three or more rows.

Figure 2:
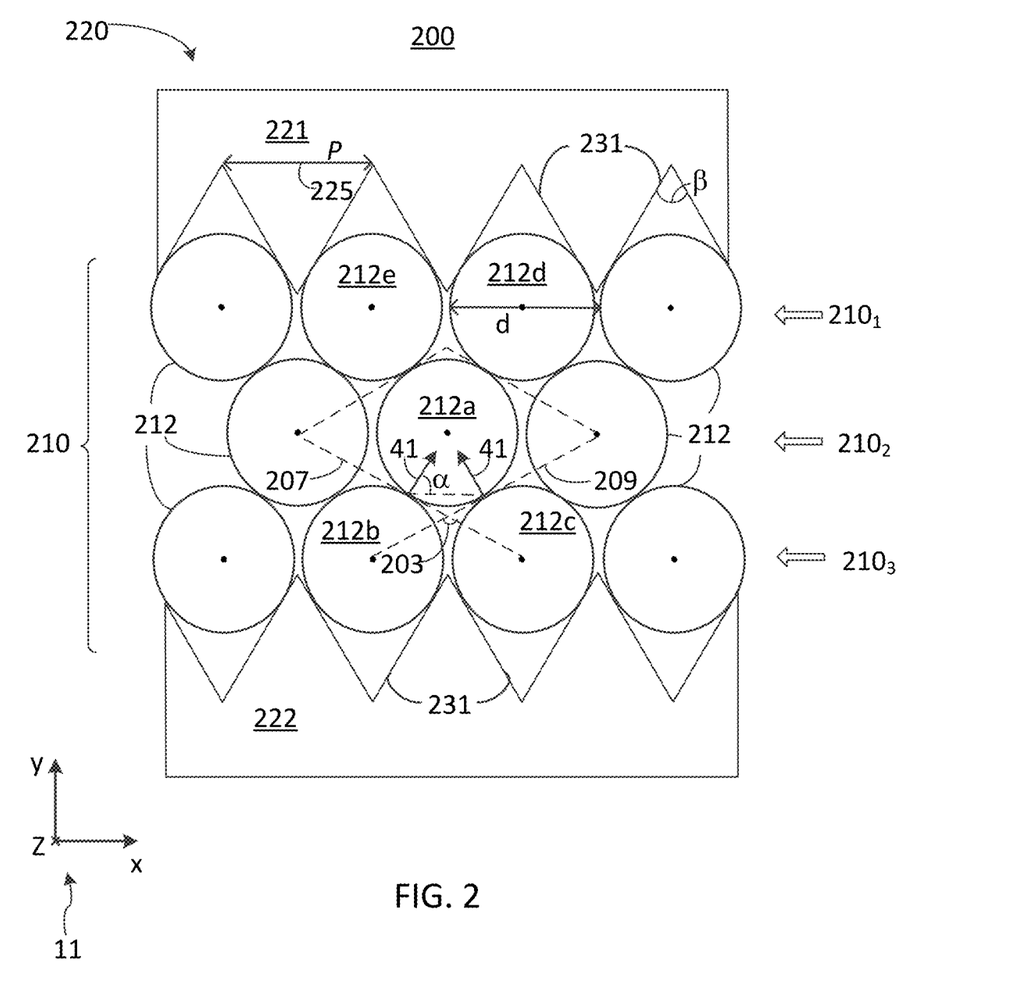
FIG. 2 is a schematic partial front view of a FAU holding optical fiber ends arranged according to a hexagonal lattice.

FIG. 2 illustrates one possible arrangement of optical fibers in a FAU of an optical connector, e.g. the optical connector 120. In the illustrated example, a FAU 200 includes an optical fiber array 210 having three rows $210_1$, $210_2$, $210_3$ of optical fibers 212 held between an opposing pair of plates 221, 222. The pair of plates 221, 222 may be secured to each other to form, or be a part of, an array holder 220. The fiber-facing surface of each of the plates 221, 222 has an array of parallel fiber-holding grooves 231 configured to hold optical fibers 212 of the outer rows $210_1$, $210_3$ in place. In the illustrated example, each of the optical fibers 212 has the same outer diameter d, and the grooves 231 of each of the plates are parallel v-grooves positioned periodically with a groove pitch P1 approximately equal to, or slightly exceeding, the outer fiber diameter d. By way of example, the outer fiber diameter d may be ~125 microns (μm), and the groove pitch $P_1$ in the fiber array 210 may be ~127 μm. The array 210 is close to a maximum-density hexagonal 2D array, wherein the cores of the optical fibers 212 of the array 210 are disposed near nodes of a hexagonal lattice with an angle of rotational symmetry of 60°, with most optical fibers of the middle row $210_2$ being each surrounded by six adjacent optical fibers, and held in place by four adjacent fibers located at corners of a rectangle with unequal sides. E.g., an optical fiber 212a of the middle row $210_2$ is prevented from moving laterally, along the x-axis, partly by the reaction forces R 41 of two adjacent optical fibers 212b, 212c of the lower row $210_3$, and partly by the reaction forces of two adjacent optical fibers 212d, 212e of the upper row $210_1$. The reaction forces 41 are perpendicular to a pair of planes 207, 209 that are tangential to the fibers 212b and 212c, respectively, at their points of contact with the fiber 212a. The tangential planes 207, 209 form one of two virtual v-grooves holding the fiber 212a in place in the lateral direction (X-axis). That is, with fibers 212b and 212c firmly in place, the forces they exert upon fiber 212a are the same as would have been exerted by a corresponding v-groove (207, 209) replacing the fibers 212b, 212c. One drawback of the approximately hexagonal fiber arrangement of FIG. 2 is that this virtual v-grove is relatively shallow, with an obtuse apex angle 203 of approximately 120°, and may not provide a sufficiently stable lateral confinement for the central fiber 212a. The magnitude of the lateral component of the reaction force R 41, $R \cdot \cos(\alpha)$, which pushes the fiber 212a into the virtual groove, is smaller than the magnitude of its vertical, or transverse, component $R \cdot \sin(\alpha)$, by approximately a factor of $1/\sqrt{3} \cong 0.58$. Here, α is the angle of the reaction force 41 relative to the lateral direction (X-axis); this angle α may be referred to herein as the holding angle or the reaction angle. In the OFA of FIG. 2 the reaction angle α is about 60°.

Figure 3:
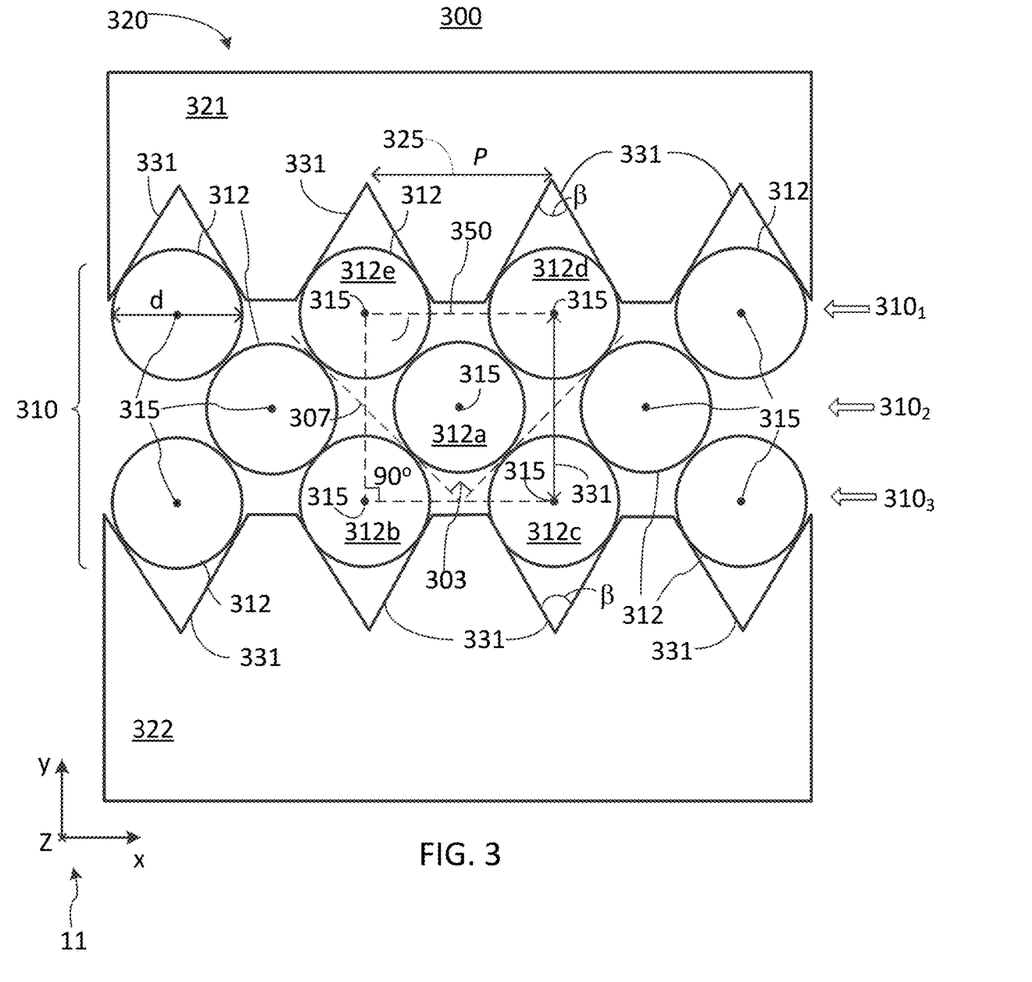
FIG. 3 is a schematic partial front view of a FAU holding optical fibers arranged according to a square lattice.
Figure 11:
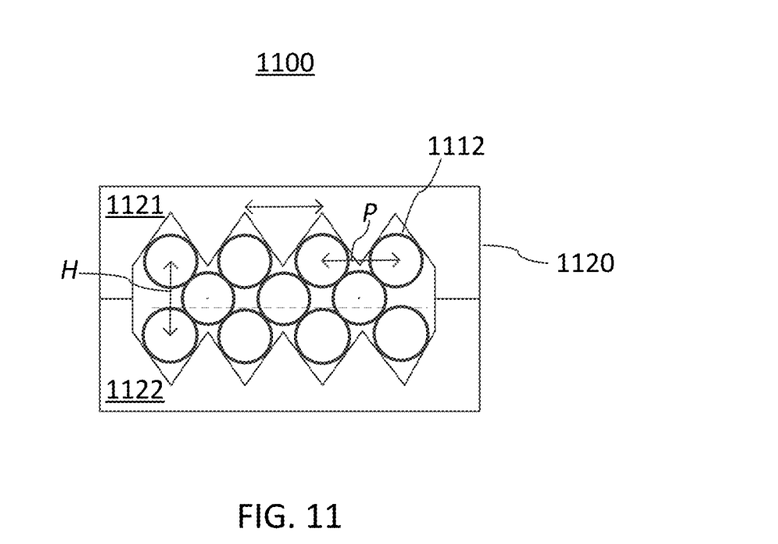
FIG. 11 is a schematic front view of an example FAU.

FIG. 3 illustrates one example of a preferred arrangement of optical fibers of a multi-row optical fiber array 310 in a FAU 300 of an optical fiber array connector. The FAU 300 of FIG. 3 may be an example of the FAU 120 of FIG. 1, with longitudinally aligned fiber ends 157 shown in a vertical cross-section along a line A-A (FIG. 1). FIG. 3 may also represent a partial front view of the FAU 300. Similar to the FAU 200 of FIG. 2, the FAU 300 of FIG. 3 includes three rows $310_1$, $310_2$, $310_3$ of optical fibers 312 of the OFA 310 having the longitudinally aligned ends thereof (e.g., 157, FIG. 1) held between an opposing pair of plates 321, 322. The pair of plates 321, 322 may be bonded to each other to form, or be a part of, an array holder 320, e.g. as illustrated in FIG. 11. The array holder 320 may be an example of the array holder 122.

In an example implementation, all, or at least most (>50%), of the optical fibers 312 have an approximately same outer diameter d±δ, within a tolerance range of 2δ. By way of example, d≅125 μm, δ≅0.5 μm, or 0.7 μm, or as defined by fiber manufacturer's specifications. In another example, d≅80 μm, and δ≅0.5 μm, or 0.7 μm, or as defined by fiber manufacturer's specifications. The fiber-facing surface of each of the plates 321, 322 has an array of parallel longitudinally extending fiber-holding grooves 331 configured to hold optical fibers 312 of the outer rows $310_1$, $310_3$ in place. In the arrangement of FIG. 3, the grooves 331 of each of the plates 321, 322 are positioned periodically with a groove pitch P that exceeds the nominal fiber diameter d approximately by a factor of √2:

$$P \cong \sqrt{2} \cdot d \quad (1)$$

The groove pitch P defines the lateral spacing of optical fibers 312 in the fiber array 310, and may also be referred herein as the lateral pitch. The equation (1) relating the groove pitch P to the fiber diameter d may hold approximately, i.e. with up to ±15% deviations from the value given by the RHS (right-hand side) of equation (1). In some implementations, the groove pitch P may be within ±10% of the value given by the RHS of equation (1). In some implementations, the groove pitch P may be within +\−15 μm, or within ±10 μm, or ±2 μm of the value given by the RHS of equation (1). By way of example, d≅125 μm, P is 177±15 μm, or 177±10 μm. By way of another example, d≅80 μm, P is 113±12 μm, or 113±8 μm, or 1135 μm.

In some implementations, the optical fibers 312 of the optical fiber array 310 may be held such that cores 315 of the optical fibers 312 are disposed at or near nodes of a square lattice. In a square-lattice arrangement, most of the optical fiber 312 in a middle row $310_2$, except those at the edges of the fiber array, touch four adjacent fibers whose cores 315 are disposed at corners of a square. E.g., lines connecting cores 315 of the optical fibers 312e, 312b, 312c, and 312d in the outer rows $310_1$, $310_3$, which are adjacent fiber 312a of the middle row $310_2$, form a square 350, with each side of the square 350 approximately equal to √2·d. With this arrangement, the virtual "grooves" (e.g., 307) formed by tangential planes to fibers of the outer rows $310_1$, $310_3$ (e.g. 312b and 312c) have ~90° apex angles (e.g. 303), providing an improved lateral stability of the fibers in the middle row $310_2$ (e.g., 312a).

Figure 4:
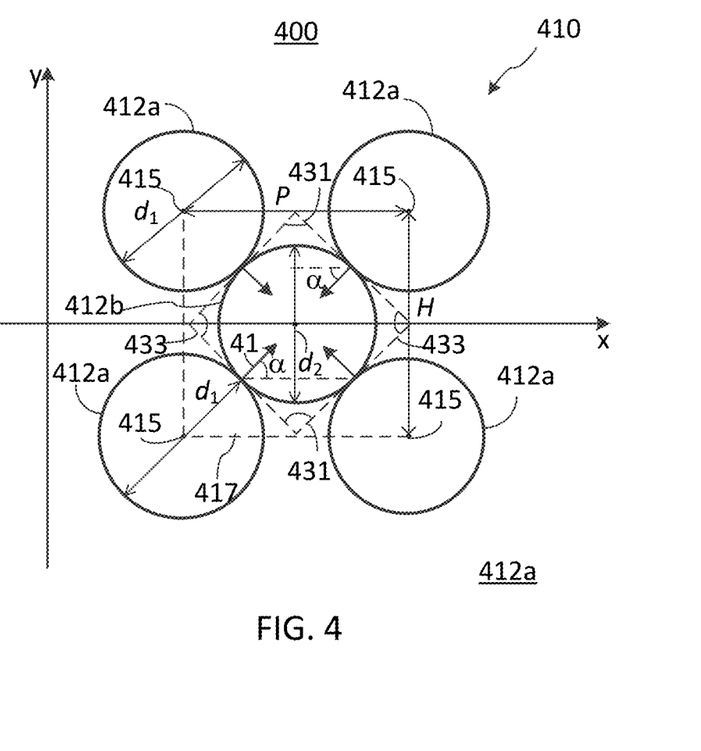
FIG. 4 is a schematic diagram illustrating a 5-fiber cell of the 2D fiber array of a FAU of FIG. 3 with equal-diameter fibers.

FIG. 4 illustrates one "cell" 410 of an example optical fiber array 410, with cores 415 of the optical fibers of the fiber array 400 arranged on a rectangular (e.g., square) lattice. The cell 410 includes four outer fibers 412a of a diameter $d_1$, each touching a middle fiber 412b having a diameter $d_2$ that may or may not differ from the diameter $d_1$. The fiber array 400 may be a three-row array including a periodic repetition of the cell 410 along the lateral dimension, i.e. the X-axis, with a period ("lateral pitch") that may be equal to the groove pitch P of a holding plate (not shown in FIG. 4). In the cell 410, fiber cores 415 of the outer fibers 412a are disposed at corners of a rectangle 417, the outer optical fibers 412a touching the middle fiber 412b, with the pair of opposing laterally extending sides of the rectangle 417 having a length equal to the lateral pitch P, and the other pair of opposing sides having a length H ("transverse pitch") defined by equation (2).

$$H = \sqrt{(d_1 + d_2)^2 - P^2} \quad (2)$$

The four outer optical fibers 412a hold the middle optical fiber 412b in place with reaction forces (e.g., 41) directed at a "reaction" angle $\pm\alpha$ with respect to the lateral direction (the X-axis). The reaction angle may be approximately defined by equation (3).

$$\cos(\alpha) = \frac{P}{(d_1 + d_2)} \quad (3)$$

Figure 5:
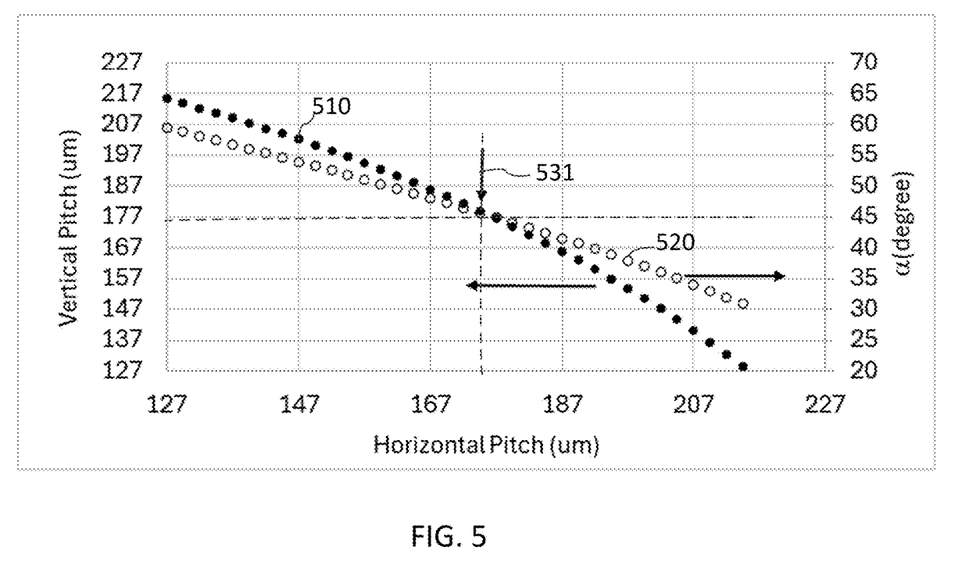
FIG. 5 is a graph illustrating a transverse (vertical) pitch H and a reaction angle of a fiber array versus the lateral pitch P of the lattice.

Referring to FIG. 5, curves 510 and 520 illustrate the transverse pitch H of the array 410 and the reaction angle $\alpha$ versus the lateral pitch P for an example case of $d_1=d_2=d=125$ µm. As can be seen from the graph, a symmetrical square-lattice arrangement indicated by arrow 531, with H=P=d√2 ($\cong$176.8 µm in the illustrated example), corresponds to the reaction angle $\alpha$=45°. In this symmetrical arrangement, the reaction forces 41 from the outer fibers 412a hold the middle fiber 412b in place along the lateral (X-axis) and transverse (Y-axis) directions with equal force F=R·cos($\alpha$)=R·sin($\alpha$)=R/√2, where R is the magnitude of the reaction force R 41. In other words, pairs of virtual v-grooves 431 and 433, which are effectively formed by the outer fibers 412a, and which hold the middle fiber 412b in place, are both 90° v-grooves. As the lateral pitch P becomes either greater or smaller than the value given by equation (1), one of these virtual v-grooves becomes shallower, making it easier for the middle fiber 412b to shift.

Figure 6A:
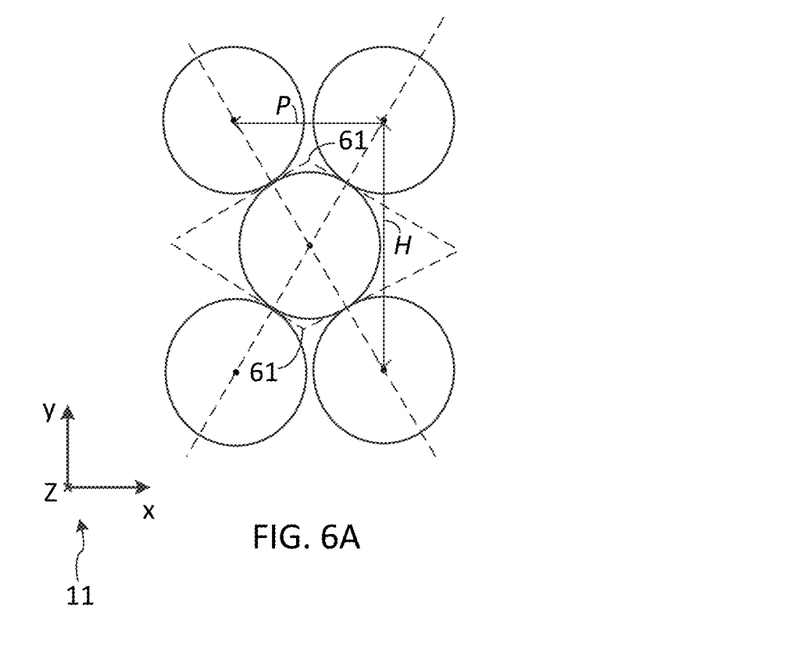
FIG. 6A is a schematic diagram illustrating a 5-fiber cell of a 3-raw FAU with a lateral pitch P smaller than a transverse pitch H.
Figure 6B:
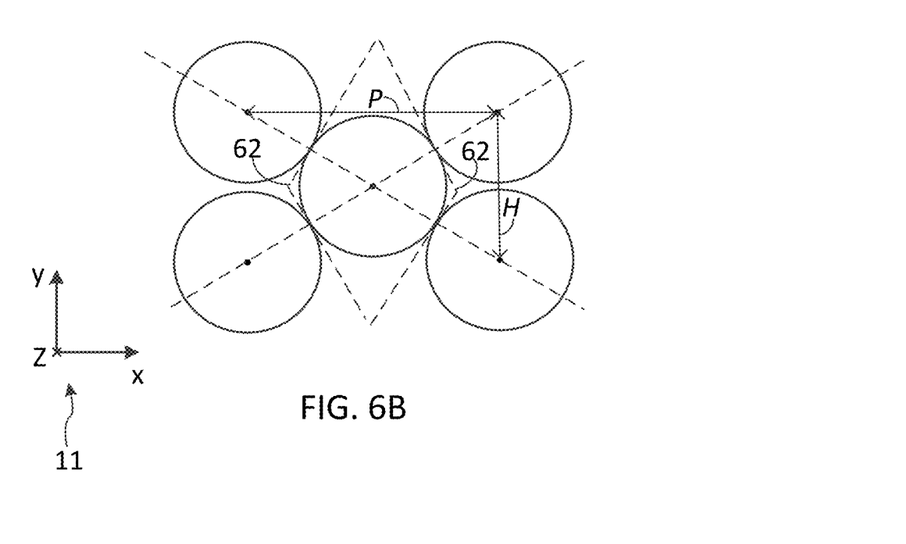
FIG. 6B is a schematic diagram illustrating a 5-fiber cell of a 3-raw FAU with P>H.

FIG. 6A illustrates a configuration of the cell 410 in which H>P, resulting in a pair of virtual v-grooves 61 holding the middle fiber in place along the X-axis being shallow, potentially reducing the horizontal, or lateral, stability of the middle optical fiber. FIG. 6B illustrates a configuration of the cell 410 in which H<P, resulting in a pair of virtual v-grooves 62 holding the middle fiber in place along the Y-axis being shallow, potentially reducing the vertical, or transverse, stability of the middle optical fiber. Accordingly, implementations with H$\cong$P and $\alpha\cong$45°, may be preferred as potentially more stable. This may hold also for embodiments where the nominal fiber diameter $d_2$ of the outer fibers 412a differs from a nominal fiber diameter $d_1$ of the middle fibers 412b.

FIGS. 4 and 5 illustrate an example wherein the diameter of each of the optical fibers 412a, 412b is equal to its nominal, or "design" value d. The actual outer diameter $d_a$ of individual optical fibers in a fiber array, e.g., 410, may vary within some tolerance range, e.g., from $d_{min}=(d-\delta)$ to $d_{max}=(d+\delta)$. In one implementation, the fiber array 410 may be configured to accommodate optical fibers of the largest outer diameter $d_{max}$ with the specified tolerance range. E.g., the fiber array 410 of FIG. 4 may be configured so that the space between the outer fibers 412a is large enough to accommodate a middle fiber 412b having a maximum fiber diameter $d_{max}$ within the tolerance range. However, in sufficiently large fiber arrays an actual outer diameter of any one of the fibers of the array may be at the lower bound $d_{min}$ of the tolerance range, so that this smaller fiber, and/or potentially one or more adjacent fibers, may become loose and shift from the design position(s) in a FAU, potentially increasing an optical coupling loss for the fiber when the FAU is used in an optical connector.

Figure 7A:
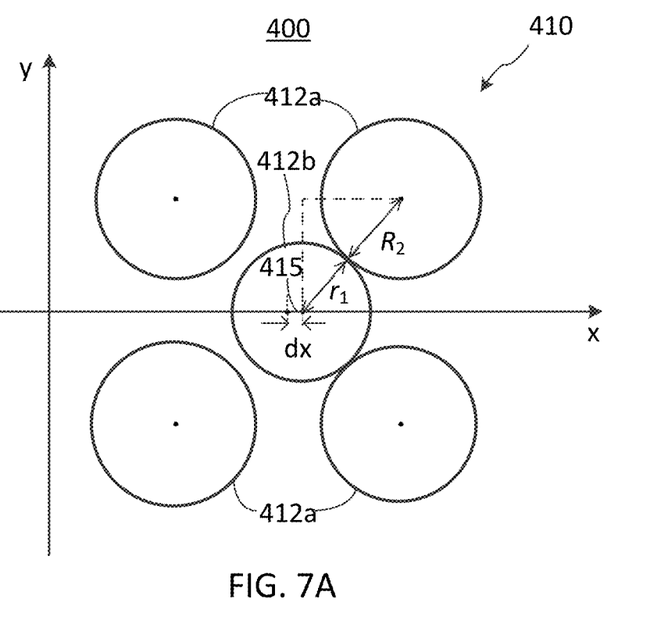
FIG. 7A is a schematic diagram illustrating a maximum lateral displacement of a smaller central optical fiber of a 5-fiber cell of the 2D fiber array of the FAU of FIG. 3.
Figure 7B:
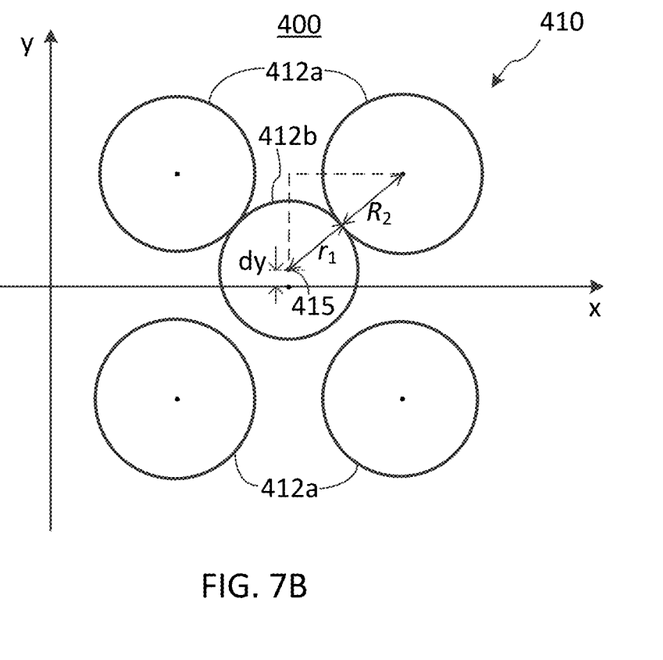
FIG. 7B is a schematic diagram illustrating a maximum vertical displacement of a smaller central optical fiber of the 5-fiber cell of the 2D fiber array of the FAU of FIG. 3.

FIGS. 7A and 7B illustrate example configurations of the cell 410 of the optical fiber array 400 where the actual diameter $d_{1b}=2r_1$ of the middle optical fiber 412b is smaller than the nominal, or "design", value $d_1$ thereof based on which the lateral (groove) pitch P and the transverse pitch H of the array 410 are set, e.g., in accordance with equation (2), and therefore the middle optical fiber 412b can shift within the space between the outer fibers 412a of the fiber array cell 410. FIG. 7A illustrates a configuration corresponding to a maximum lateral shift dx of the core of the optical fiber 412b, while FIG. 7B illustrates a configuration corresponding to a maximum transverse shift dy of the core of the optical fiber 412b.

Figure 8:
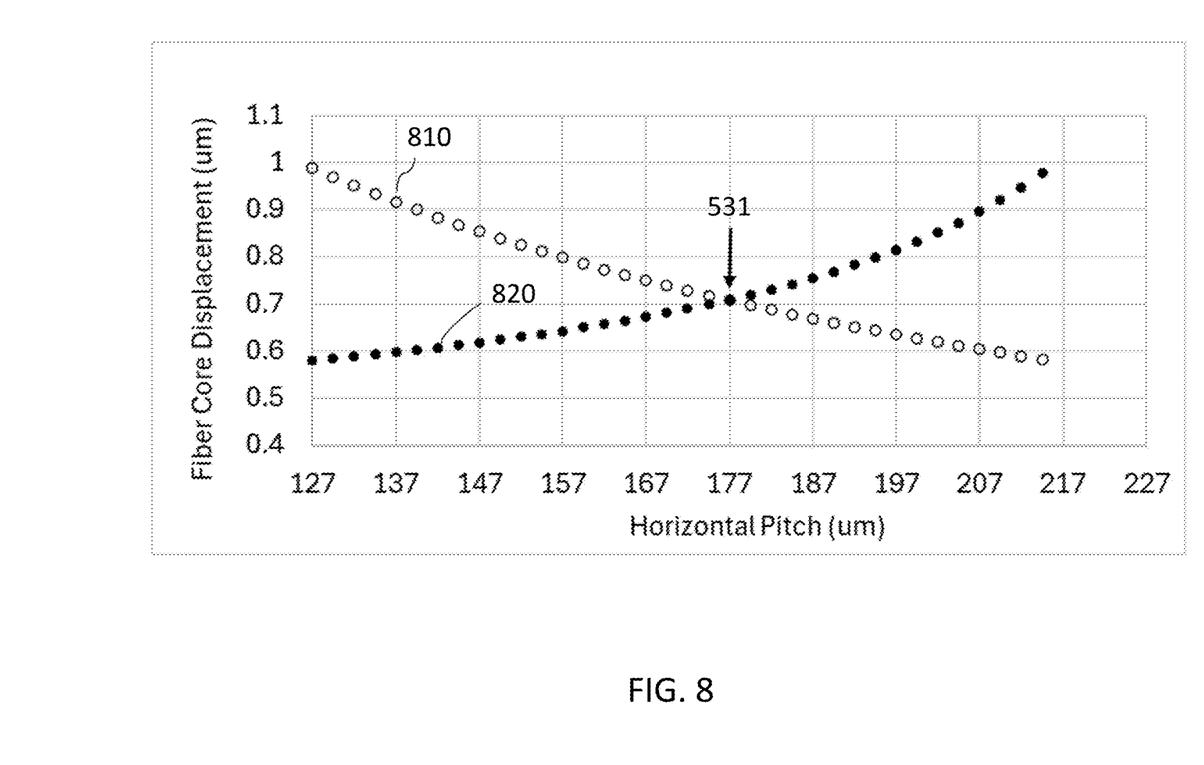
FIG. 8 is a graph illustrating possible displacement of a smaller-diameter fiber in a middle row of a FAU in the transverse and lateral directions of the fiber array.

Referring to FIG. 8, the maximum values of the transverse shift dy and the lateral shift dx of the center fiber 412b versus the horizontal pitch P are shown by plots 810 and 820, respectively, for one possible configuration of the cell 410 of a fiber array 400. In the example illustrated in FIG. 8, the transverse pitch H of the fiber array 400 satisfies equation (2) with $d_1=d_2=d=125$ µm, actual diameters of the outer optical fibers 412a are equal to the "design" value d, while the actual diameter of the center fiber 412b is smaller than the FAU design value d=125 µm by twice the fiber diameter tolerance $\delta$, with $\delta$=0.5 µm in this example. As can be seen from the plots 810 and 820, a symmetrical square-lattice configuration 531 with H=P=d√2=177 µm minimizes maximum possible offset of the core of the middle fiber 412b from its target location. E.g., in the example illustrated in FIG. 8, the maximum possible shift of the center fiber in the square array configuration of FIG. 3 is approximately 0.7 µm (~$\delta$·√2), while the maximum possible shift of an optical fiber (e.g. 212a) in the middle row of the hexagonal array configuration of FIG. 2 (P$\cong$127 µm) is greater, about 1 µm (~2$\delta$). This difference in optical core offset may result in a noticeable difference in optical coupling to an external waveguide, in particular when a fiber shift within the FAU is added to some "base" core-to-core offset, e.g. due to small variations in the groove-to-groove distance of the FAU and small but finite variations in the exact location of an optical core of the external optical waveguide to which a particular fiber of the FAU is being coupled. By way of example, in an approximation of a Gaussian beam having a mode field diameter in the fiber ~9 µm, reducing the core-to-core offset from, e.g., 2.4 µm to 2 µm may reduce the coupling loss by about 0.34 dB, while reducing the core-to-core offset from 2.9 µm to 2.5 µm may reduce the coupling loss by about 0.43 dB.

Accordingly, in some implementations, a FAU (e.g. 120 or 300) may be configured to hold a 2D array of optical fibers between two grooved surfaces having a groove pitch P approximately equal to d·√2, where d is a nominal outer fiber diameter of at least some, and typically a majority (i.e. $\geq$50%), of the optical fibers of the array. The outer fiber diameter is typically the diameter of the cladding of the optical fiber, with the term "nominal" referring to a corresponding diameter value specified by the fiber manufacturer. Here, "approximately" means within a range of ±15%. In various implementations, the grating pitch P may be in a range of ±15 μm, or ±10 μm, or ±5 μm about the value given by equation (1).

Referring again to FIG. 3, the grooves 331 holding the optical fibers 312 of the outer rows $310_1$, $310_3$ in place within the FAU 300 may generally have different shapes. In an example embodiment, the grooves 331 are so called v-grooves, formed by two inclining surfaces, which are generally flat and merge to define an apex with an apex angle β. In some implementation, the apex angle β of the fiber-holding grooves 331 may be approximately 60°±10°. In some implementations, the apex angle β may be in a range from about 60° to about 90°.

Some considerations that may be relevant to the apex angle β of a fiber-holding v-grove for holding a 2D square-lattice OFA, such as that described above with reference to FIG. 3 or FIG. 4, will now be described with reference to FIGS. 9A and 9B.

Figure 9A:
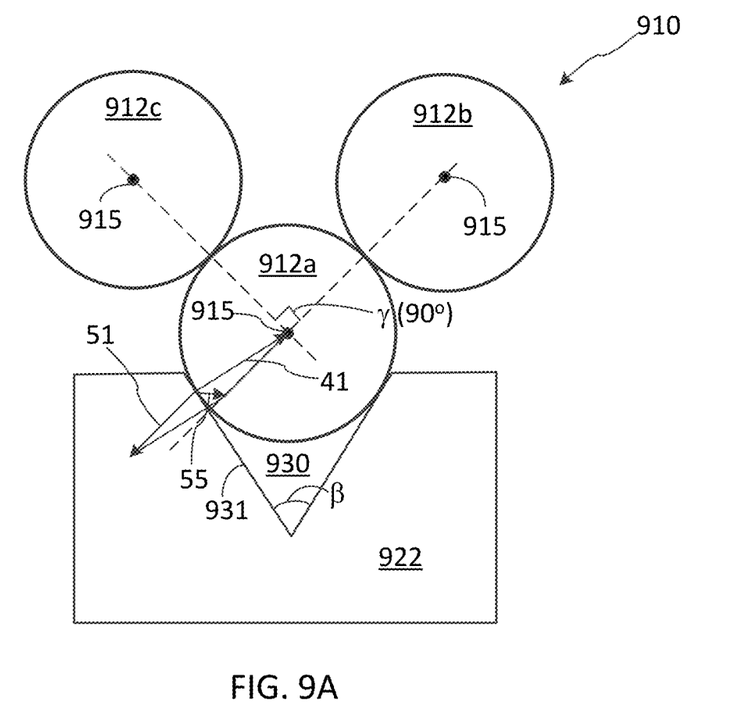
FIG. 9A is a schematic diagram illustrating forces acting on an optical fiber of a multi-row fiber array in a v-groove with an apex angle <90°

FIG. 9A illustrates an optical fiber 912a of a square-lattice OFA 910 located partially within a v-groove 930 formed in a support plate 922. The v-groove 930 has an acute apex angle β <90°, e.g. ~60°. The optical fiber 912a is being held partially within the v-groove 930 by pressure from adjacent optical fibers 912c and 912b of the OFA 910. Optical cores 915 of the fibers 912a, 912b, 912c are located at nodes of a same square lattice, and lines connecting the cores 915 of adjacent fibers 912c and 912a, 912a and 912b intersecting at an angle γ≅90°. Fiber 912a is being pushed into a surface 931 of the v-groove 930 by fiber 912b with a force 51 directed along a line connecting the cores 915 of these optical fibers 912a, 912b. The surface 931 exerts upon the optical fiber a reaction force 41 directed normally to the surface 931. Because the apex angle β of the v-groove is smaller than the angle γ (~90°) between lines connecting the cores of the adjacent fibers, the vector sum of the forces 41 and 51 is a net force 55 directed into the v-groove. This net force pushes the optical fiber 912a into the v-groove 930, which is advantageous for positional stability of the fiber.

Figure 9B:
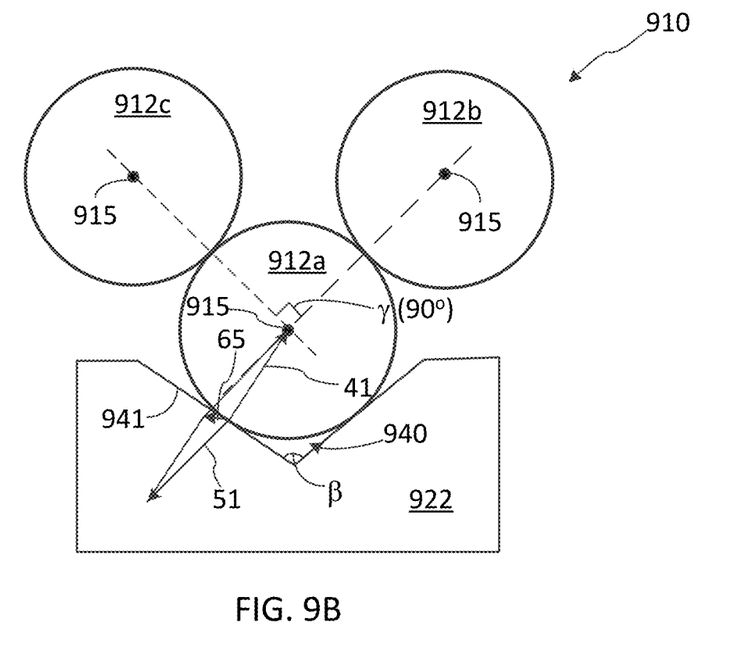
FIG. 9B is a schematic diagram illustrating forces acting on an optical fiber of a multi-row fiber array in a v-groove with an apex angle >90°

FIG. 9B illustrates an optical fiber 912a of a square-lattice OFA 910 located partially within a v-groove 940 formed in a support place 922. The v-groove 930 has an obtuse apex angle β>γ=90°, e.g. ~100°. Fiber 912a is being pushed into a surface 941 of the v-groove 940 by fiber 912b with a force 51 directed along a line connecting the cores 915 of these optical fibers 912a, 912b. The surface 941 exerts upon the optical fiber a reaction force 41 directed normally to the surface 941. Because the apex angle β of the v-groove 940 is obtuse, i.e. greater than 90°, and greater than the angle γ (~90°) between the lines connecting the cores 915 of the three fibers, the vector sum of the forces 41 and 51 is a net force 65 directed out of the v-groove. This net force effectively pushes the optical fiber 912a out of the v-groove 940, which may be disadvantageous for positional stability of the fiber 912a within the groove 940.

The FAU 300 of FIG. 3 may be a part of an optical connector, e.g. OFAC 150 of FIG. 1, configured to couple a 2D array of optical fibers to another optical element, e.g. the photonic chip 110 of FIG. 1. The optical connector may further include a 2D lens array located next to end-faces of the optical fibers of the array, e.g. the lens array 140 of FIG. 1.

Figure 10:
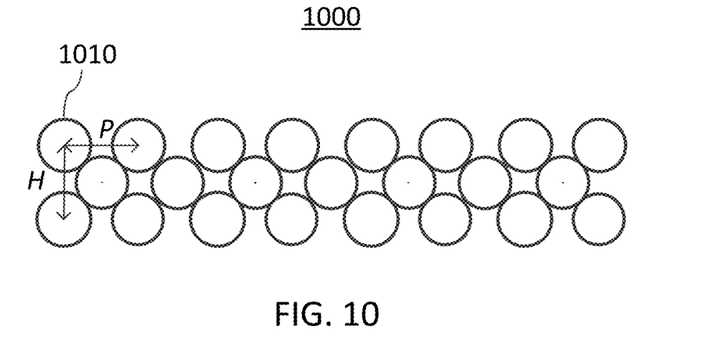
FIG. 10 is a schematic plan view of a 2D lens array of an optical connector comprising the FAU of FIG. 3

FIG. 10 schematically illustrates an example layout of a lens array 1000 that may embody the lens array 140 of the optical connector 150. The lens array 1000 includes a 2D array of micro-lenses 1010 disposed on square lattice that may be substantially identical to the square lattice of the OFA of the connector, with the same lateral pitch P and the transverse pitch H. In the final assembly of the optical connector, each micro-lenses 1010 may be located directly in front of and optically aligned, with, a corresponding one of the optical fibers of the connector's FAU.

FIG. 11 schematically illustrates a FAU 1100 including a fiber array holder 1120, which includes an opposing pair of plates 1121, 1122 having grooved array-facing surfaces for holding optical fibers 1112 in outer rows of the fiber array in place. The FAU 1100, the fiber array holder 1120, and the plates 1121, 1122 are examples of the FAU 300, the fiber array holder 320, and the plates 321, 322 described above. The plates 1121, 1122 are secured, e.g. bonded, to each other at the edges, fixing the transverse pitch H. In the illustrated example, the FAU 1100 is shown to hold 11 optical fibers 1112 in three rows. This is however by way of example only, and the optical fiber array of the FAU 1100 may include e.g, from 5 to up to 100 or more optical fibers per row, and from 24 to 48 optical fibers in some example implementations per row.

The optical fiber array unit, examples of which are described above, may have significant advantages in, e.g., fiber array density and manufacturability compared to some alternative designs. Furthermore, fiber array units with an approximately square-lattice arrangement of densely packed longitudinally aligned fiber ends may have advantages in mechanical stability, and therefore alignment precision when used in an optical connector, compared to some alternative FAU designs, such as the hexagonal-array FAU configuration illustrated in FIG. 2.

The examples described above are not intended to be limiting, and many variations will become apparent to a skilled reader having the benefit of the present disclosure. For example, such variations may include FAUs comprising more than three rows of optical fibers. In some embodiments the outer diameters of the optical fibers of a FAU may differ from 125 μm. In some embodiments the optical fibers of a middle row of a multi-row fiber array of the FAU may have different outer diameters than the optical fibers of the outer rows of the array.

One or more examples described above, e.g. in the summary section and with reference to any one or more of the FIGS. 1-10, provide an apparatus comprising an optical fiber array unit (e.g. 120, FIG. 1; 200, FIG. 2; 300, FIG. 3; 1100, FIG. 11). The optical fiber array unit comprises an opposing pair of grooved plates (e.g. 221 and 222, FIGS. 2; 321 and 322, FIGS. 3; 1121 and 1222, FIG. 11)), each grooved plate of the opposing pair has an array of parallel fiber-holding grooves (e.g. 231, FIG. 2; 331, FIG. 3) having a groove pitch P (e.g 225, FIG. 2; 325, FIG. 3). At least three rows (e.g. $210_1$, $210_2$, $210_3$, FIG. 2; $310_1$, $310_2$, $310_3$, FIG. 3) of optical fibers (e.g 212, FIG. 2; 312, FIG. 3) having longitudinally aligned ends thereof (e.g. 157, FIG. 1) are being held between the opposing pair of grooved plates, with at least some of the optical fibers in each of the at least three rows touching two optical fibers of an adjacent one of the at least three rows.

In any of the above implementations, optical fibers of one of the at least three rows (e.g. $310_2$, FIG. 3) are displaced with a lateral offset of approximately, ±1 μm, one half of the groove pitch P relative to the optical fibers in an adjacent one (e.g. $310_1$ or $310_3$, FIG. 3) the at least the three rows.

In some implementations, the groove pitch P of the array of parallel fiber-holding grooves of each grooved plate is approximately √2d, where d is an outer diameter of at least some of the optical fibers held between the opposing pair of grooved plates. In some implementations, d is 125±1 µm, and the groove pitch P is 177±15 µm. In some of these implementations, the groove pitch P is in a range from 166 µm to 188 µm.

In some implementations, the outer fiber diameter d is approximately 80 µm, and the groove pitch P may be 113±15 µm. In some of these implementations, the groove pitch P may be in a range from 103 µm to 123 µm.

In some implementations, at least some of the optical fibers of one of the at least three rows may have an outer fiber diameter of $d_1$; at least some of the optical fibers in an adjacent one of the three rows may have an outer fiber diameter of $d_2$; and the groove pitch P of each v-grooved plate of the opposing pair may be approximately $(d_1+d_2)/\sqrt{2}$, ±15%.

In any of the above implementations, the optical cores (e.g. 315, FIG. 3) of the longitudinally aligned ends of the optical fibers may be located at nodes of a square lattice.

In any of the above implementations, the fiber-holding grooves may comprise v-grooves. In some implementations, the v-grooves may have an apex angle (e.g., FIG. 3) of less than 90°. In some implementations, the apex angle of each of the v-grooves may be approximately 60°.

In some of the above implementations, the longitudinally aligned ends of the optical fibers may be held between the opposing pair of grooved plates in three rows, wherein the optical fibers in two outer ones of the three rows (e.g., $310_1$, $310_3$, FIG. 3) are located partly in the fiber-holding groves (e.g., 331, FIG. 3). In some of these implementations, the longitudinally aligned ends of the optical fibers in the optical fiber array unit may each have a same nominal outer fiber diameter d, and the groove pitch P may be approximately $\sqrt{2}d$.

In any of the above implementations, the apparatus may comprise an optical connector (e.g., 150, FIG. 1) including the fiber array unit. In some implementations, the optical connector may further comprise a 2D micro-lens array (e.g., 140, FIG. 1; 1000, FIG. 10) disposed at an end face of the fiber array unit, the 2D micro-lens array comprising at least three rows of microlenses (e.g. 1010, FIG. 1), each of the microlenses optically coupled to a corresponding one of the optical fibers (e.g. 312, FIG. 3) of the optical fiber array unit. The microlenses in each row of the 2D micro-lens array may be disposed in a square lattice matching the square lattice of the optical fiber array unit.

Unless explicitly stated otherwise, each numerical value and range should be interpreted as being approximate as if the word "about" or "approximately" preceded the value or range.

It will be further understood that various changes in the details, materials, and arrangements of the portions which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Furthermore, in the description above, for purposes of explanation and not limitation, specific details are set forth such as particular architectures, interfaces, techniques, etc. in order to provide a thorough understanding of the present disclosure. In some instances, detailed descriptions of well-known devices, circuits, and methods are omitted so as not to obscure the description of the present disclosure with unnecessary detail. Thus, for example, it will be appreciated by those skilled in the art that block diagrams herein can represent conceptual views of illustrative circuitry embodying the principles of the technology. All statements herein reciting principles, aspects, and embodiments of the disclosure, as well as specific examples thereof, are intended to encompass both structural and functional equivalents thereof.

Thus, while the present disclosure has been particularly shown and described with reference to example embodiments as illustrated in the drawing, it will be understood by one skilled in the art that various changes in detail may be affected therein without departing from the spirit and scope of the disclosure as defined by the claims.

We claim:

1. An apparatus comprising:
an optical fiber array unit comprising:
an opposing pair of grooved plates, each grooved plate of the opposing pair has an array of parallel fiber-holding grooves having a groove pitch P; and
at least three rows of optical fibers having longitudinally aligned ends thereof held between the opposing pair of grooved plates, with at least some of the optical fibers in each of the at least three rows touching two optical fibers of an adjacent one of the at least three rows; and wherein the groove pitch P of the array of parallel fiber-holding grooves of each grooved plate is approximately $\sqrt{2}d$, where d is an outer diameter of at least some of the optical fibers held between the opposing pair of grooved plates.

2. The apparatus of claim 1, wherein optical fibers of one of the at least three rows are displaced with a lateral offset of one half of the groove pitch P relative to the optical fibers in an adjacent one the at least the three rows.

3. The apparatus of claim 1 wherein the outer diameter d is 125 µm.

4. The apparatus of claim 3 wherein the groove pitch P is approximately 177 µm.

5. The apparatus of claim 3 wherein the groove pitch P is in a range from 166 µm to 188 µm.

6. The apparatus of claim 1 wherein the outer diameter d is 80 µm.

7. The apparatus of claim 6 wherein the groove pitch P is approximately 113 µm.

8. The apparatus of claim 6 wherein the groove pitch P is in a range from 103 µm to 123 µm.

9. The apparatus of claim 1 wherein the fiber-holding grooves comprise v-grooves.

10. The apparatus of claim 9 wherein the v-grooves have an apex angle of less than 90°.

11. The apparatus of claim 10 wherein the apex angle of each of the v-grooves is approximately 60°.

12. The apparatus of claim 1 wherein cores of the optical fibers held between the opposing pair of grooved plates are located at nodes of a square lattice.

13. The apparatus of claim 1 wherein the longitudinally aligned ends of the optical fibers are held between the opposing pair of grooved plates in three rows, wherein the optical fibers in two outer ones of the three rows are located partly in the fiber-holding groves.

14. The apparatus of claim 1 wherein the longitudinally aligned ends of the optical fibers in the optical fiber array unit have each a same nominal outer fiber diameter d, and wherein the groove pitch P is approximately $\sqrt{2}d$.

15. The apparatus of claim 1 comprising an optical connector including the fiber array unit.

16. The apparatus of claim 15 wherein the optical connector comprises a 2D micro-lens array disposed at an end face of the fiber array unit, the 2D micro-lens array comprising at least three rows of microlenses, each of the microlenses optically coupled to a corresponding one of the optical fibers of the optical fiber array unit.

17. The apparatus of claim 16 wherein the microlenses in each row of the 2D micro-lens array are disposed in a square lattice matching the square lattice of the optical fiber array unit.

* * * * *